(Model.)
T. DONLON.
JAW TRAP.
No. 406,202. Patented July 2, 1889.
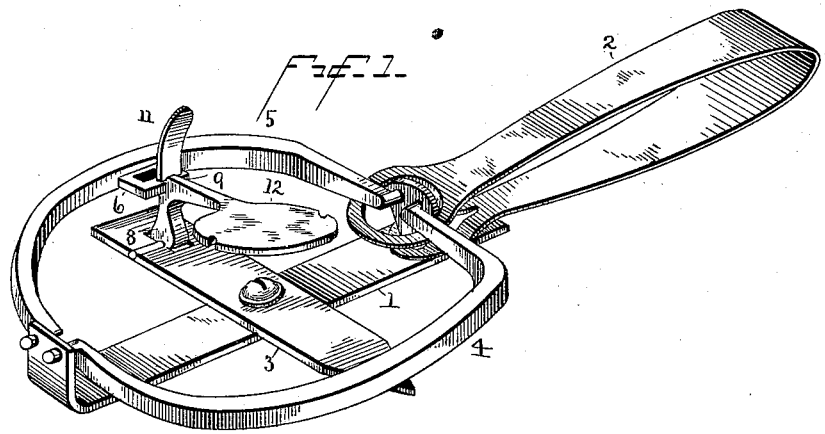
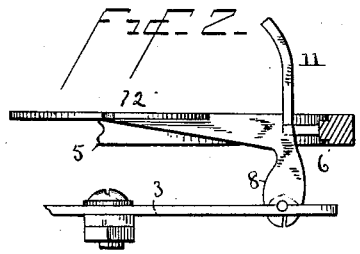
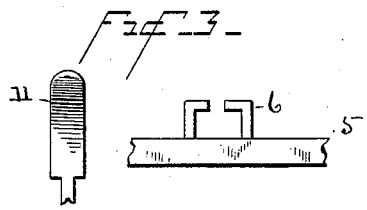
Witnesses
Morris A. Clark
T. W. Johnson
Inventor
Thomas Donlon
By his Attorneys W. A. Bartlett
N. PETERS, Photo-Lithographer, Washington, D. C.

UNITED STATES PATENT OFFICE.

THOMAS DONLON, OF CORTLAND, NEW YORK, ASSIGNOR TO THE HITCHCOCK MANUFACTURING COMPANY, OF SAME PLACE.

JAW-TRAP.

SPECIFICATION forming part of Letters Patent No. 406,202, dated July 2, 1889.

Application filed May 16, 1889. Serial No. 310,980. (Model.)

*To all whom it may concern:*

Be it known that I, THOMAS DONLON, residing at Cortland, in the county of Cortland and State of New York, have invented certain new and useful Improvements in Jaw-Traps, of which the following is a specification, reference being had therein to the accompanying drawings.

This invention relates to animal-traps of the kind known as "jaw-traps."

The object of the invention is to produce a trap in which an upward or downward movement of the bait-pan shall release the catch, so that the jaws may close.

Figure 1 of the drawings is a perspective view of my improved trap. Fig. 2 is a central section through one jaw and the catch; Fig. 3, a plan of the loop on jaw.

The numeral 1 indicates the base-bar, 2 the spring, and 3 the cross-bar, all of which may be of any common construction.

The jaws 4 5 are pivoted to the base-bar and operated on by the spring, as usual. One jaw 5 has an open loop 6 projecting inward. This loop has a passage-way 7, as shown in Fig. 3.

The catch 8 is pivoted near the outer end of the cross-bar 3, as has been done in many traps of this kind. This catch has a narrow neck 9, which will swing easily through passage 7, and above this neck an expanded head 11 extends upward, said head being too broad to pass down through passage 7. The bait-pan 12 extends from the catch 8 toward the center of the trap about at a right angle, and is either integral with or firmly attached to the catch 8. The loop 6 is about over the pivotal point of the catch 8 when the jaws are open for setting. When the trap is set, the head 11 rests on the inturned ends of the bar or bars forming the loop 6, and the tendency of the jaws to swing upward holds the loop 6 firmly up against this head. A movement of the bait-pan 12, either upward or downward swings the head 11 off from the ends of loop 6 either toward or away from the jaw 5. When the head swings in either direction far enough to free the loop 6, the loop will be liberated and the jaws will fly together.

The upwardly-extending head 11 is preferably curved about in the arc traveled by the jaw. Whether the bait-pan is pulled upward or downward in setting off the trap, the contact of the jaw with this head 11 will tend to throw the head forward and lower the bait-pan. Of course, if the bait is secured to the pan, it will be pulled down also, generally pulling the animal with it, so he will enter farther into the jaws.

If the parts be sufficiently strong, one arm of the loop 6 may be dispensed with, the principle of operation remaining the same. Other minor modifications—such as reversal of location—are within the spirit of my invention.

Of course it is an advantage to spring the trap by a pull on the bait-pan as well as by a push or pressure thereon.

What I claim, and desire to secure by Letters Patent, is—

1. In a jaw-trap, an inwardly-extending loop on one of the jaws, a catch pivoted to the base or bar, having a head which rests on this loop when the trap is set, and a bait-pan connected to said catch and acting to swing the head of the catch off from the loop on the jaw with either an upward or a downward movement of said pan, all in combination, substantially as described.

2. In a jaw-trap, a jaw having an inwardly-projecting loop, a catch pivoted to the base and having a head engaging said loop, an upwardly-extending head on said catch about in the path of movement of the jaw, and a bait-pan rigidly connected to said catch, all combined substantially as described.

3. In an animal-trap, the combination of a jaw having an inwardly-projecting loop with arms therefrom, a pivoted catch having a neck capable of swinging through said passage, and a head above the same too broad to enter said passage, and an upward projection of said head about in line of movement of said jaw, and a bait-pan rigidly connected to said catch, all in combination, substantially as described.

In testimony whereof I affix my signature in presence of two witnesses.

THOMAS DONLON.

Witnesses:
E. L. DODD,
JOHN W. SUGGETT.